United States Patent [19]
Bourdonne et al.

[11] Patent Number: 4,785,520
[45] Date of Patent: Nov. 22, 1988

[54] PROCESS FOR LOCATING THE IDEAL SCREWING POSITION OF BOLTS OF LARGE DIMENSIONS

[75] Inventors: Jean-Claude Bourdonne, Le Breuil; Alain Briand, Le Creusot, both of France

[73] Assignee: Framatome, Courbevoie, France

[21] Appl. No.: 924,530

[22] Filed: Oct. 29, 1986

[30] Foreign Application Priority Data

Oct. 29, 1985 [FR] France ............................ 85 16061

[51] Int. Cl.$^4$ .......................................... B23Q 17/22
[52] U.S. Cl. ...................................... 29/407; 29/240;
29/723; 29/525.1; 29/906; 376/260; 376/263
[58] Field of Search .................. 226/8, 24; 376/245,
376/249, 260, 263, 463; 29/400 N, 407, 703,
705, 720, 723, 240, 326 R; 414/589, 590; 901/6,
9, 16, 46

[56] References Cited

U.S. PATENT DOCUMENTS

| | | | |
|---|---|---|---|
| 3,824,674 | 7/1974 | Inoyama et al. | 29/407 |
| 3,851,906 | 12/1974 | Frisch et al. | 376/463 X |
| 3,984,006 | 10/1976 | Takeyasu et al. | 414/591 X |
| 4,048,687 | 9/1977 | Kato et al. | 29/407 X |
| 4,620,450 | 11/1986 | Yamaguchi | 29/407 X |
| 4,667,389 | 5/1987 | Hasha | 29/407 |
| 4,675,967 | 6/1987 | Okada | 29/240 |

FOREIGN PATENT DOCUMENTS 110519  6/1984  Japan ............................... 29/407

*Primary Examiner*—Carl E. Hall
*Assistant Examiner*—Andrew E. Rawlins
*Attorney, Agent, or Firm*—Pollock, Vande Sande & Priddy

[57] ABSTRACT

Process and device for locating the ideal screwing position of bolts of large dimensions wherein a bolt (10) is lowered under control until it engages in the tapping recess of an orifice (5), the bolt (10) is rotated in the opposite direction to screwing, the point of engagement of the threads (11) of the bolt (10) in the threads of the tapped orifice (5) is detected, screwing is started under control by the rotation of the bolt in the normal direction, successive seizures are detected during the screwing, and after each seizure the ideal screwing position is located by means of a suitable path from the center corresponding to the preceding stop previously recorded, screwing is resumed after each detection of the new ideal screwing center, and the screwing of the bolt (10) is continued at a high speed until the end of screwing is detected.

1 Claim, 5 Drawing Sheets

FIG.5
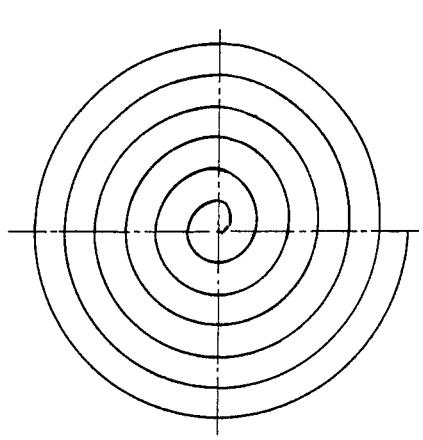
FIG.5a
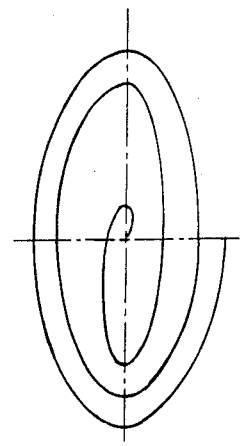
FIG.5c
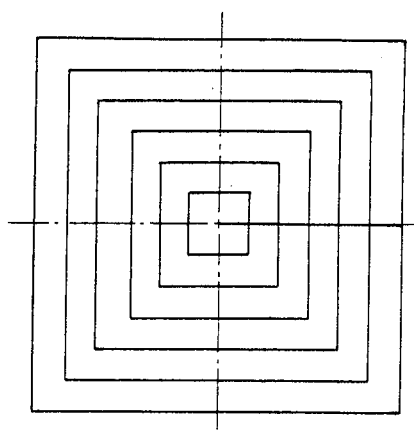
FIG.5b
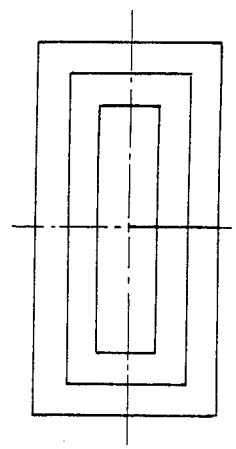
FIG.5d

PROCESS FOR LOCATING THE IDEAL SCREWING POSITION OF BOLTS OF LARGE DIMENSIONS

FIELD OF THE INVENTION

The present invention relates to a process and a device for locating the ideal screwing position of bolts of large dimensions, especially for fastening the cover of a vessel belonging, for example, to a nuclear reactor.

BACKGROUND OF THE INVENTION

It is known that, in nuclear reactors, the cover is fastened removably to the vessel, to make it possible to recharge the reactor with fuel periodically and, as a result of this, inspect the interior of the vessel.

For this purpose, the cover is fastened to the reactor vessel by means of bolts which are screwed into the collar of the vessel and which penetrate into smooth holes provided in the collar of the cover. These bolts are usually used in fairly large numbers and are relatively close to one another, with the result that, to remove and refit the cover, it is necessary to unscrew and screw all these bolts as to well as tension them.

These operations of screwing or unscrewing the bolts are problematical and difficult to carry out. In fact, the bolts weight several hundred kilograms, so that, when the bolt is screwed into the thread or when it is unscrewed, it is necessary to overcome frictional resistances which occur in the thread and which are greater, the heavier the bolt. Moreover, the axes of the various elements of the screwing appliance, after operation, do not always coincide with the axes of the tapped holes in the vessel or with the axes of the bolts. Consequently, it often happens that the bolt cannot automatically come in line coaxially at the moment when it is introduced into the tapped hole in the vessel, and this operation therefore has to be carried out manually, as do the first turns to screw in the bolt. As a result, during this work the personnel risk staying for an excessively long period in a zone where the radioactive radiation is too high.

These defects in alignment, which can also cause the bolt to seize when it is screwed into the tapped hole in the vessel, set up in the moving parts irregular stresses which are distributed about their axis of translation or rotation and which can cause through friction irregular and premature wear of these parts.

A known appliance for screwing and unscrewing bolts allows a certain freedom of axial orientation of the bolt by means of a ball-and-socket and air-cushion system combined with a driving joint having two degrees of freedom in two directions perpendicular to one another.

However, this appliance is extremely complicated and does not make it possible to locate the preferred screwing direction during the fitting of the bolts, with the result that excessive friction can arise on the moving parts.

SUMMARY OF THE INVENTION

The object of the invention is, therefore, to propose a process for locating the ideal position of the bolt for screwing with a minimum torque, so as to prevent jamming.

To achieve this object, after the bolt has been fastened to a screwing/unscrewing device, a check is made to ascertain that the bolt (10) is vertical and is aligned with the axis of the tapped orifice, the bolt is lowered under control, until it engages in the tapping recess of the orifice, the bolt is rotated in the opposite direction to screwing, the point of engagement of the threads of the bolt in the threads of the tapped orifice is detected, the rotation of the bolt in the opposite direction is stopped, and the start of screwing is controlled by rotating the bolt in the normal direction a few turns, if possible, and at low speed, if, during this screwing, a first seizure of the bolt in the tapped orifice, when the screwing torque becomes greater than a specific disengaging torque, is detected, the rotation of the bolt is stopped, as soon as this first seizure is detected, the first location of the ideal screwing position of the bolt is carried out by means of a suitable path, this first location is stopped at the moment when the screwing torque again becomes less than the disengaging torque, and the coordinates of the new ideal screwing center are recorded, screwing is continued at a reduced speed for a few turns, and if possible the screwing speed is increased, during this screwing, each new seizure is detected, and after each seizure a new location of the ideal screwing position is carried out by means of a suitable path from the center corresponding to the preceding stop previously recorded, screwing is resumed after each detection of the new ideal screwing center, and screwing of the bolt continues at high speed until the end of screwing is detected.

The invention also relates to a device for locating the ideal screwing position of bolts of large dimensions.

BRIEF DESCRIPTION OF THE DRAWINGS

To make it easier to understand the invention, an embodiment of the process and device according to the invention will now be described, with reference to the attached drawings.

FIG. 5 is a diagram showing the different paths for locating the ideal screwing position.

DESCRIPTION OF THE PREFERRED EMBODIMENT

Figure 1:
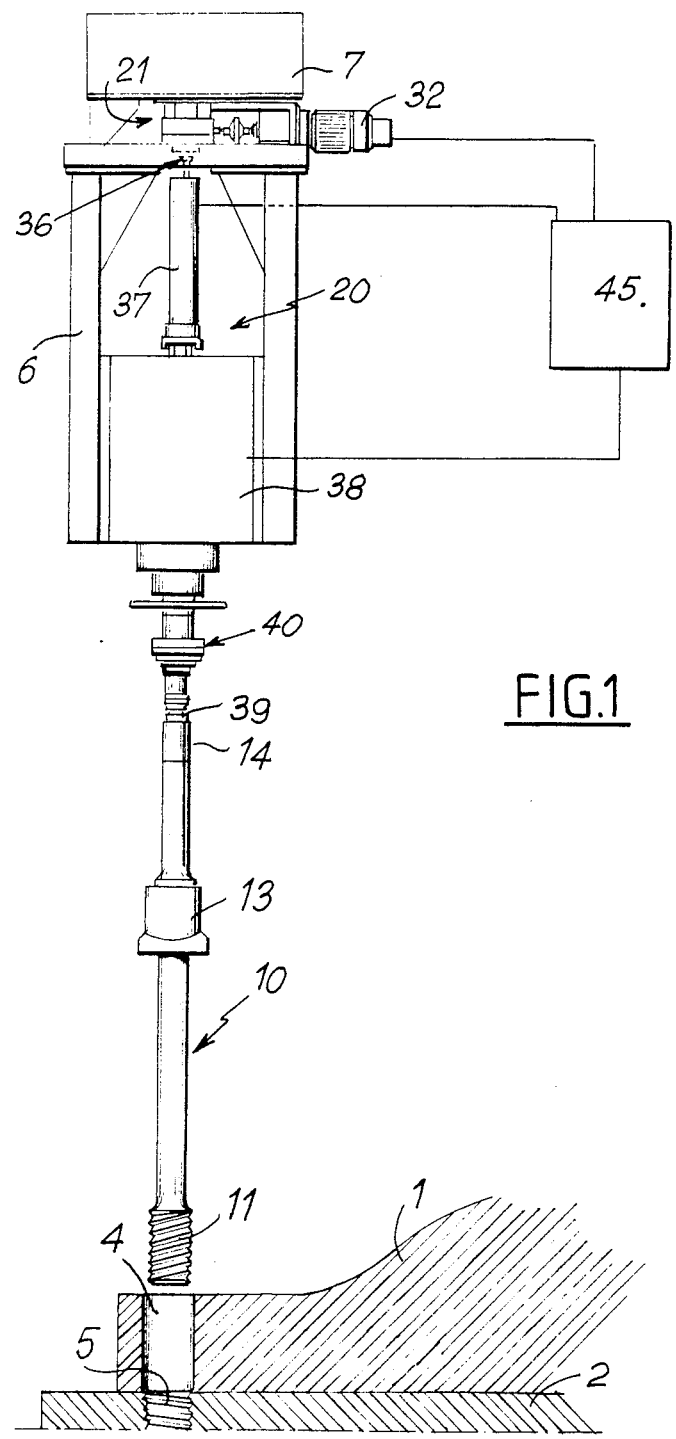
FIG. 1 is a diagrammatic plan view showing the installation of the screwing device according to the invention.
Figure 2:
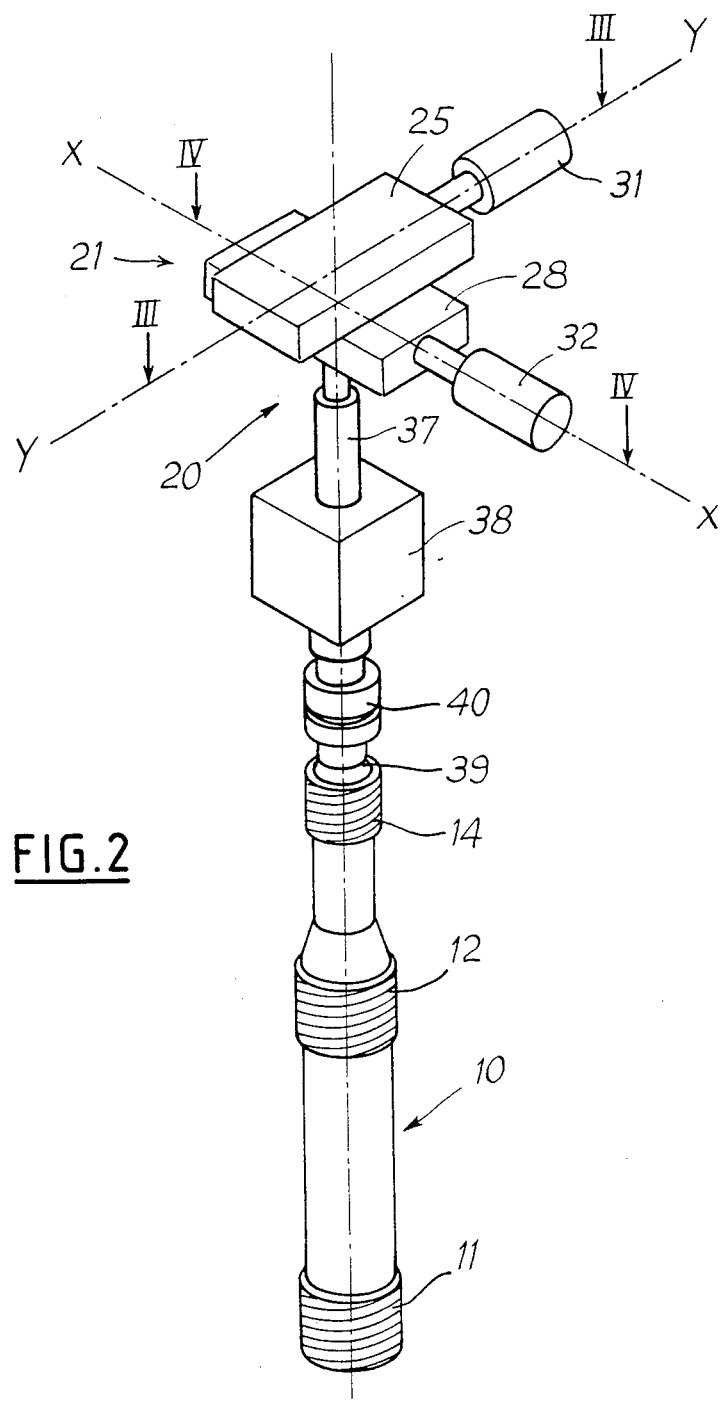
FIG. 2 is a diagrammatic perspective view of the screwing device according to the invention.

The screwing and unscrewing device according to the invention, as illustrated in FIGS. 1 and 2, is used to open or close a cover 1 of a vessel 2 belonging, for example, to a nuclear reactor.

As is well known, the cover 1 and the vessel 2 have a form of revolution about a vertical geometric axis. The cover 1 is fastened removably to the vessel 2 by means of several bolts 10 of vertical axis, which are distributed uniformly on the periphery of the cover 1 and of the vessel 2.

Each bolt 10 passes through a smooth hole 4 provided vertically in the peripheral edge of the cover 1 and is provided, in its lower part, with a thread 11 intended to be screwed into a tapped hole 5 in the peripheral edge of the vessel 2, and, in its middle part, with a second thread 12, on which is screwed a vessel nut 13. On the other hand, the bolt 10 has, in its upper part, circular grooves or threads 14 of suitable profile, which allow it to be tensioned. It also has in its upper part an internal recess for the insertion of a system for gripping and rotating by means of the screwing and unscrewing device according to the invention.

This screwing/unscrewing device, designated as a whole be reference numeral 20, is supported by means of a frame 6 on a carriage 7 moving along rails (not shown). A table 21 executing orthogonal intersecting movements is mounted underneath the carriage 7.

Figure 3:
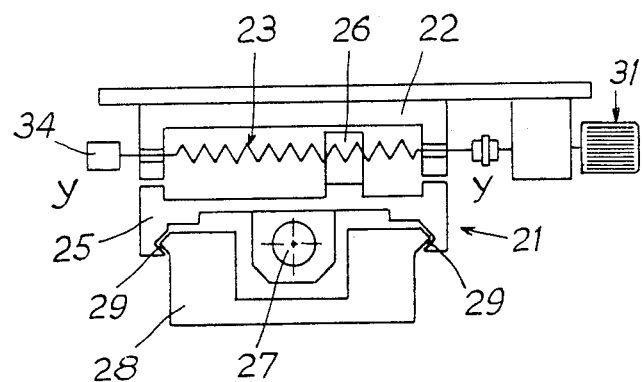
FIG. 3 is a sectional view along the line III—III of the upper part of FIG. 2.
Figure 4:
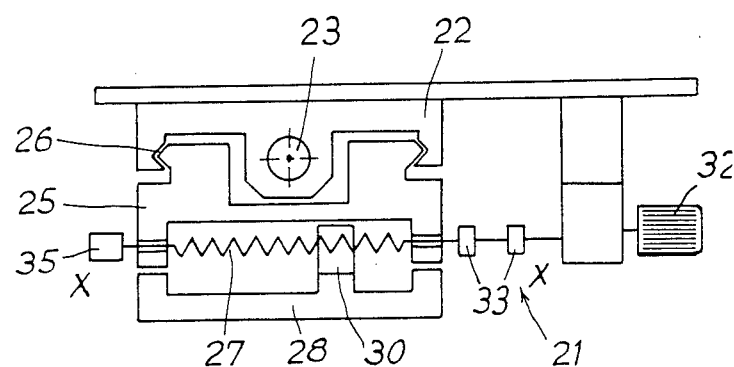
FIG. 4 is a sectional view along the line IV—IV of the upper part of FIG. 2.

As shown in FIGS. 2 to 4, this table 21 consists of a fixed suspended bench 22 provided in its lower part with a translational screw 23. The bench 22 supports, by means of ball-bearing travellers 24 (FIG. 4) a first carriage 25 which has, in its upper part, a nut 26 (FIG. 3) moving along on the screw 23 and ensuring the translation of the said carriage along an axis Y.

The first carriage 25 is equipped, in its lower part, with a translational screw 27 which is identical to the screw 23, but the axis of which is perpendicular to that of the screw 23. This first carriage 25 supports a second carriage 28 by means of ball-bearing travellers 29 (FIG. 3) fastened to the said first carriage 25. The second carriage 28 has, in its upper part, a drive nut 30 (FIG. 4) actuated by the screw 27 and ensuring the translation of the said carriage 28 along an axis X perpendicular relative to the axis Y.

The screws 23 and 27 are coupled, at one of their ends, to respective brake reduction units 31 and 32 fastened to the bench 22, the reduction unit 32 of the screw 27 being coupled to the latter by means of a cardan assembly 33 as result of the relative movement of the two carriages 25 and 28. Moreover, the screws 23 and 27 each receive at their other end an incremental coder 34 and 35, respectively, making it possible to control the table 21 as a whole.

The screw/nut systems (23, 26–27, 30) and the reduction units (31, 32) can be replaced, for example, by jacks articulated at one end on the bench 22 or on the first carriage 25 and at the other end on the first carriage 25 and the second carriage 28, respectively.

The second carriage 28 supports, by means of a connection 36, a servo-controlled weight compensator 37 consisting, for example, of a hydraulic jack. The purpose of this jack 37 is to exert an axial compensating force of a desired value, this value comprising the weight of the moveable assembly of the device and of the bolt plus or minus the low value desired, depending on whether this value is to be exerted on the bolt in the compression direction during screwing or in the pulling direction during unscrewing. On the other hand, the jack 37 has a stroke which amply suffices to cover the entire screwing travel of the bolt and also to cover the axial insertion or extraction movements. An axial position-measuring sensor (not shown) is installed in the weight-compensating jack 37.

Mounted on the lower end of the compensator 37 is a reversible variable-speed screwing system 38 which drives any member 39 gripping the bolt 10, thus making it possible to exert a driving torque in both directions and an axial force on the said bolt.

A torque limiter 40, subject to a triggering value corresponding to the maximum screwing torque, is interposed between the screwing system 38 and the gripping member 39. This torque limiter 40, for example a ball-type limiter, actuates a built-in micro-contact (not shown) which controls the operation of the table 21.

The screwing torque of the bolt 10 can also be limited by measuring it on the output shaft of the screwing system 38 in relation to a threshold value.

The connection between the screwing system 38 and the bolt 10 by means of the gripping member 39 is of the semi-rigid type, thus allowing an angular freedom of, for example, 2° at most.

The device as a whole is controlled by programmable auto-control unit, indicated at 45 in FIG. 1, for controlling the location of the ideal screwing position by means of the table 21, the actual screwing, i.e., the lowering and the rotation to the left and to the right, the bottom end of travel and finally the weight compensation by means of the hydraulic jack 37.

The device thus described operates as follows:

To fasten the cover 1 to the vessel 2, the screwing-/unscrewing device 20 supporting a bolt 10 by means of the gripping member 39 is positioned above the orifices 4 and 5 of the cover 1 and of the vessel 2. A check is made to ascertain that the bolt 10 is vertical, and that it is positioned in a theoretical fixed position corresponding to the drilling interval of the tappings for the fastening bolts.

The resetting of the system 21 for position location according to the axes XY is also checked.

After these checking operations, the hydraulic jack 37 is activated, and the programmable auto-control unit 45 controls the lowering of the bolt 10 actuated by the said controlled jack. As soon as the bolt 10 engages in the recess of the tapping 5, on the instruction of the auto-control unit 45, the weight of the bolt 10 is compensated from 90% to 95% by the jack 37, so that the first thread of the tap does not have to support the said bolt.

Subsequently, the screwing system 38 is rotated in the opposite direction to screwing, to locate the point of engagement of the threads which causes the bolt 10 to drop slightly. This drop is detected by the vertical displacement sensor incorporated in the weight-compensating jack 37.

At the moment when this point is detected, the reverse rotation of the screen system 38 is stopped, and the auto-control unit 45 controls the start of screwing by rotating the screwing system in the normal direction by two to three turns, if possible, and at a low speed.

If the bolt 10 seizes in the tapped orifice 5, the screwing torque becomes greater than the disengaging torque of the limiter 40, with the result that the screwing system 38 continues to rotate, but the bolt 10 is no longer driven in rotation. The limiter 40 actuates the built-in micro-contact which, in turn, by means of the programmable auto-control unit 45, controls the activation of the table 21 of the system XY with orthogonal intersecting movements, to locate the ideal screwing position of the bolt 10.

At the start of screwing, if there is a seizure, since the deviations in position do not have a preferred direction, the ideal position will be located according to a path in the form of circular or square Archimedean spirals, as is shown in FIGS. 5a and 5b, respectively.

The option of circular or square spirals is a programming choice, and the process can be used either with circular spirals or with square spirals and with one or other of the means of driving the carriages 25 and 27, i.e., with the reduction units 31, 32 or with hydraulic jacks.

Consequently, as soon as the seizure is detected, the auto-control unit 45 controls the motors 31 and 32 according to a predetermined program, the effect of which is to actuate the screws 23 and 27 and displace the the carriages 25 and 28 simultaneously, the carriage 25 being displaced along the axis Y and the carriage 28 along the axis X. Under the action of these carriages, the movement is transmitted to the bolt 10, so that the end of the said bolt describes a circular spiral a (FIG. 6) in order to locate the ideal screwing position.

Figures 6, 7:
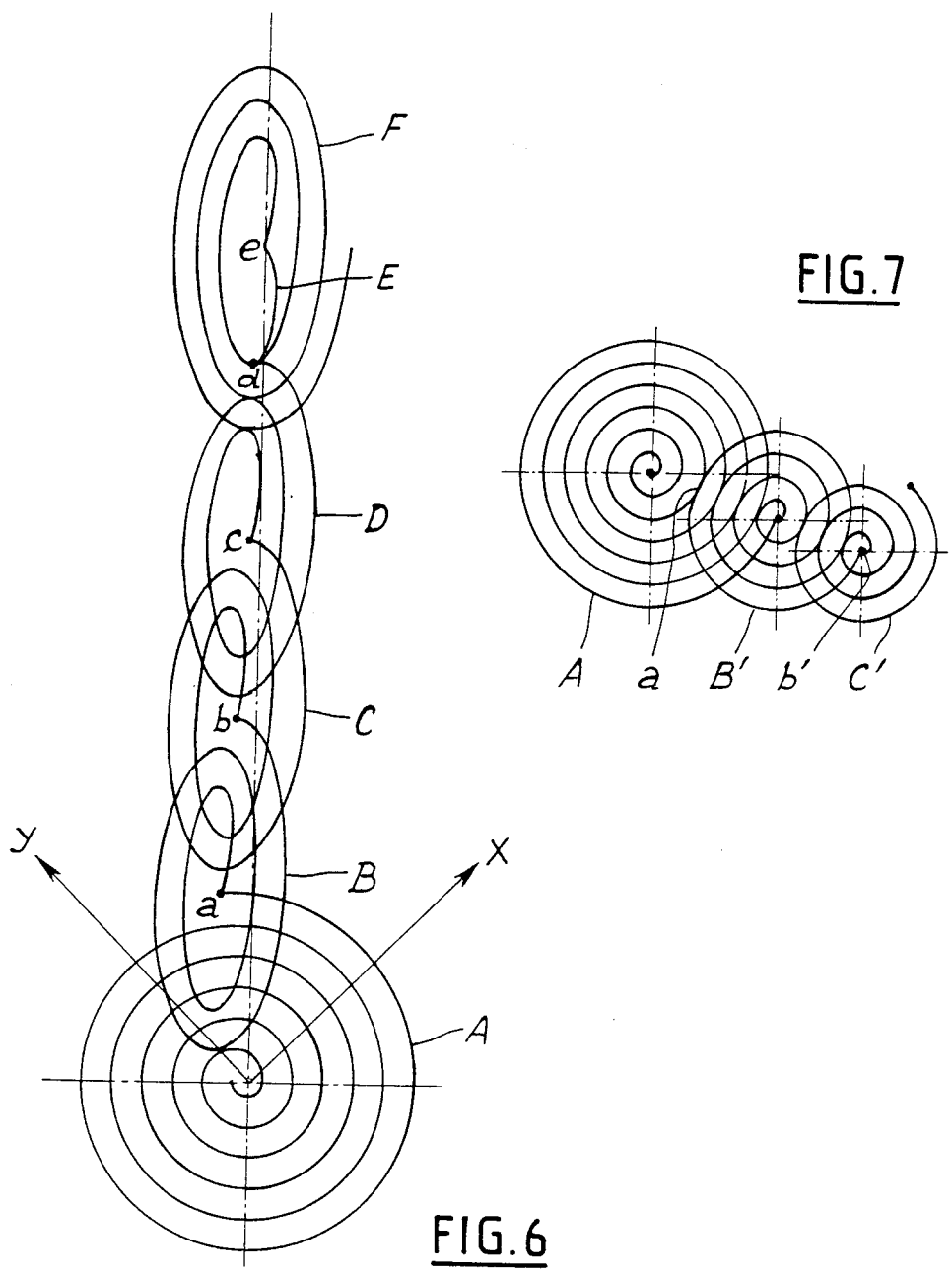
FIGS. 6 and 7 are diagrams showing how the sequences for locating the ideal screwing position are superimposed.

This ideal screwing position, for example a in FIG. 6, is detected when the screwing torque once again falls below the disengaging torque of the limiter 40. The micro-contact incorporated in the said limiter cuts off the supply to the motors 31 and 32 of the carriages 25 and 28, and the coordinates of the point a, which are measured by the coders 34 and 35 of the screws 33 and 27, are recorded in the auto-control unit 45. The limiter 40 again permits the bolt 10 to be screwed in by the screwing means 38.

Screwing thus continues for two or three turns at a low speed, with a progressive increase in the screwing speed and complete screwing of the bolt if there is no further seizure.

Should a second seizure occur, the torque limiter 40 disengages and, by means of the built-in micro-contact and the auto-control unit 45, activates the carriages 25 and 28 again for a second location of the ideal screwing point.

This second location is carried out from the point a (FIG. 6) corresponding to the stop for the preceding location, and this time, if a preferred direction of seizure emerges, in a flattened or rectangular Archimedean spiral, as shown in FIGS. 5c and 5d, according to the option initially selected which, in the example described, is an initially circular spiral.

Consequently, under the action of the carriages 25 and 28, the end of the bolt 10 describes, from the center a, a flattened Archimedean spiral B up to the new ideal screwing position b FIG. 6. This position b is likewise detected at the moment when the screwing torque once again falls below the disengaging torque of the limiter 40. This limiter again permits the screwing of the bolt 10 by the screwing means 38, and the coordinates of the point B are recorded in the auto-control unit 45.

The bolt 10 is screwed at a high speed, until it is screwed in completely, if possible, or until a new seizure occurs.

Should one or more further seizures occur, the new location of the ideal screwing position is carried out each time from the previously recorded center by means of a new flattened spiral (C D E F), up to a new ideal screwing center (c d e) which is recorded in the auto-control unit 45.

The location of the ideal screwing position is thus renewed after each seizure, and it is assumed that several seizures can occur during the screwing in of a bolt.

Of course, the centers (a, b, c, etc.) of the ideal screwing positions can be located on either side of the axis Y or in a different preferred direction of location and at any point on the various spirals.

In contrast to this, if there is no preferred direction after the first location of the ideal screwing position, the new location of the ideal screwig position again takes place from the point a corresponding to the stop of the preceding location, but in a circular or square spiral (FIGS. 5a, 5b) according to the option initially selected which, in the present case, is a circular spiral.

Consequently, under the action of the carriages 25 and 28, the end of the bolt 10 describes, from the center a (FIG. 7), a new circular spiral B' up to the new ideal screwing position b' and so on.

The end of screwing is detected by the axial-position sensor integrated in the weight-compensating jack 37. This screwing process is renewed for each bolt of the reactor vessel.

For unscrewing, the prerecorded resumption of the screwing position permits the start of unscrewing. Weight compensation is now set, for example, at 105% of the weight of the bolt, and the disconnection of the table executing orthogonal intersecting movements makes it possible to conclude this unscrewing.

It will be seen that the advantages of the process and device according to the invention are that it becomes possible to screw bolts by means of a cumulative location of the ideal screwing position, to prevent considerable stresses from being set up in the moving parts and causing, as result of friction, irregular and premature wear of these parts. Furthermore, the process also makes it possible for the operations of screwing the cover onto the vessel to be carried out more easily, and to reduce the screwing times appreciably, while at the same time avoiding the need for personnel to take action, during this work, in a zone where the radioactive radiation is too high.

The process and device according to the invention are used not only in nuclear power stations possessing a pressurized-water reactor, but in other sectors of the nuclear industry, in petroleum and petrochemical plants, in mining outfits or for closing turbines, hydraulic valves, pressurized pipes or valve bodies. In general terms, the process and device according to the invention are used in many industrial installations which employ large-size screwing elements.

What is claimed is:

1. Process for locating the ideal screwing position of bolts of large dimensions, especially for fastening the cover of a vessel having tapped orifices, including the steps, subsequent to fastenign the bolt (10) to a screwing/unscrewing device (20), of
    (a) making a check to ascertain that the bolt (10) is vertical and is aligned with the axis of the tapped orifice (5);
    (b) lowering the bolt (10) under control, until it engages in a tapping recess of the orifice (5);
    (c) rotating the bolt (10) in the direction opposite to screwing;
    (d) detecting the point of engagement of the threads (11) of the bolt (10) in the threads of the tapped orifice (5);
    (e) arresting the rotation of the bolt (10) in the opposite direction and controlling the start of screwing by rotating the bolt in the normal direction by a few turns, if possible, and at a low speed;
    (f) arresting the rotation of the bolt (10) if, during this screwing, a first seizure of the bolt (10) in the tapped orifice (5), when the screwing torque becomes greater than a specific disengaging torque, is detected;

(g) locating the ideal screwing position of the bolt (10) according to a circular or square spiral path, as soon as said first seizure is detected;

(h) detecting said ideal screwing position at the moment when the screwing torque again becomes less than the disengaging torque, and recording the coordinates of a new ideal screwing center;

(i) continuing screwing at a reduced speed for a few turns, and, if possible, increasing the screwing speed;

(j) detecting each new seizure during this screwing and after each seizure locating the ideal screwing position by means of a suitable path from the center corresponding to the preceding stop previously recorded, the paths of the succeeding location of the ideal screwing positions being either flattened or rectangular spirals, if there is a preferred direction of seizure, or circular or square spirals if there is not;

(k) resuming screwing after each detection of the new ideal screwing center; and (l) continuing the screwing of the bolt (10) at high speed until the end of screwing is detected.

* * * * *